(12) United States Patent
Martin (10) Patent No.: US 11,688,051 B2
(45) Date of Patent: Jun. 27, 2023

(54) AUTOMATING INSPECTION USING NEURAL NETWORK

(71) Applicant: Johnson Controls Tyco IP Holdings LLP, Milwaukee, WI (US)

(72) Inventor: Walter Martin, Belfast (GB)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 2 days.

(21) Appl. No.: 16/752,410

(22) Filed: Jan. 24, 2020

(65) Prior Publication Data

US 2021/0233227 A1 Jul. 29, 2021

(51) Int. Cl.
| | |
|---|---|
| *G06T 7/00* | (2017.01) |
| *G06N 3/08* | (2023.01) |
| *G06F 9/48* | (2006.01) |
| *G06F 3/0482* | (2013.01) |
| *G06V 20/20* | (2022.01) |

(52) U.S. Cl.
CPC .......... *G06T 7/0004* (2013.01); *G06F 3/0482* (2013.01); *G06F 9/4881* (2013.01); *G06N 3/08* (2013.01); *G06V 20/20* (2022.01); *G06T 2200/24* (2013.01); *G06T 2207/20084* (2013.01); *G06V 2201/06* (2022.01)

(58) Field of Classification Search
CPC ............... G06T 7/0004; G06T 2200/24; G06T 2207/20084; G06N 3/08; G06K 9/00671; G06K 2209/19; G06F 9/4881; G06F 3/0482

USPC .......................................................... 382/141
See application file for complete search history.

(56) References Cited

U.S. PATENT DOCUMENTS

| | | | |
|---|---|---|---|
| 10,636,230 B1* | 4/2020 | Laranang .................. G07C 9/28 |
| 10,732,123 B2* | 8/2020 | Ahlstrom .............. G06T 7/0004 |
| 11,179,064 B2* | 11/2021 | Ng .......................... A61B 5/1128 |
| 2012/0297337 A1* | 11/2012 | St. Denis ................ G08G 1/168 |
| | | | 715/810 |
| 2016/0086078 A1* | 3/2016 | Ji ...................... G06V 30/19127 |
| | | | 382/157 |
| 2019/0362569 A1* | 11/2019 | Manoria ............... G07C 5/0808 |
| 2020/0073641 A1* | 3/2020 | Imazawa .................... G06F 8/35 |
| 2020/0184724 A1* | 6/2020 | Schell .................. G06K 9/6202 |
| 2020/0279214 A1* | 9/2020 | Hochman .......... G06Q 10/0833 |
| 2020/0393810 A1* | 12/2020 | Kempf ............... G05B 23/0267 |
| 2021/0174482 A1* | 6/2021 | Ji ................................ G06T 7/11 |

FOREIGN PATENT DOCUMENTS

EP 3767549 * 1/2021 ............... G06N 3/04

* cited by examiner

*Primary Examiner* — Jerome Grant, II
(74) *Attorney, Agent, or Firm* — ArentFox Schiff LLP (57) ABSTRACT

Aspects of the present disclosure include methods, systems, and non-transitory computer readable media that perform the steps of capturing capture one or more images comprising a plurality of visual features of an inspected device, transmitting the one or more images to a server comprising a neural network, wherein the neural network analyzes the plurality of visual features to identify the inspected device and the server identifies the checklist comprising tasks or questions associated with an inspection process of the inspected device, receiving the checklist associated from the server, and displaying the checklist.

17 Claims, 6 Drawing Sheets

AUTOMATING INSPECTION USING NEURAL NETWORK

BACKGROUND

Inspectors, maintenance personnel, and repair technicians ("workers") may be tasked to inspect, maintain, and/or repair numerous types, makes, and/or models of devices. It may be time consuming for the workers to retrieve information relating to the particular devices they are servicing because the workers may be required to browse an inconveniently long list of devices to locate the ones they are servicing. Further, it may be difficult to browse a long list on mobile devices. Therefore, improvements in locating device information may be desired.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

An aspect of the present disclosure includes a method including capturing capture one or more images comprising a plurality of visual features of an inspected device, transmitting the one or more images to a server comprising a neural network, wherein the neural network analyzes the plurality of visual features to identify the inspected device and the server identifies the checklist comprising tasks or questions associated with an inspection process of the inspected device, receiving the checklist associated from the server, and displaying the checklist.

Aspects of the present disclosure includes a mobile device having a camera, a memory that store instructions, a processor configured to execute the instructions to cause the camera to capture one or more images comprising a plurality of visual features of an inspected device, transmit the one or more images to a server comprising a neural network, wherein the neural network analyzes the plurality of visual features to identify the inspected device and the server identifies the checklist comprising tasks or questions associated with an inspection process of the inspected device, receive the checklist associated from the server, and display the checklist.

Certain aspects of the present disclosure includes a non-transitory computer readable medium having instructions stored therein that, when executed by a processor, cause the processor to cause a camera to capture one or more images comprising a plurality of visual features of an inspected device, transmit the one or more images to a server comprising a neural network, wherein the neural network analyzes the plurality of visual features to identify the inspected device and the server identifies the checklist comprising tasks or questions associated with an inspection process of the inspected device, receive the checklist associated from the server, and display the checklist.

An aspect of the present disclosure includes a method of receiving one or more images including a plurality of visual features from a mobile device, analyzing the plurality of visual features using a neural network to identify an inspected device associated with the plurality of visual features, retrieving the checklist comprising tasks or questions associated with an inspection process of the inspected device, and transmitting the checklist to the mobile device.

Aspects of the present disclosure includes a server having a memory that store instructions, and a processor configured to execute the instructions to perform the steps of receiving one or more images including a plurality of visual features from a mobile device, analyzing the plurality of visual features using a neural network to identify an inspected device associated with the plurality of visual features, retrieving the checklist comprising tasks or questions associated with an inspection process of the inspected device, and transmitting the checklist to the mobile device.

Certain aspects of the present disclosure includes a non-transitory computer readable medium having instructions stored therein that, when executed by a processor, cause the processor to perform the steps of receiving one or more images including a plurality of visual features from a mobile device, analyzing the plurality of visual features using a neural network to identify an inspected device associated with the plurality of visual features, retrieving the checklist comprising tasks or questions associated with an inspection process of the inspected device, and transmitting the checklist to the mobile device.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

In some instances, an infrastructure may include hundreds if not thousands of sensors, equipment, safety devices, egress/ingress, heating, ventilation, and air conditioning units, and other devices that may require inspection to perform tests, maintenance, upgrade, and/or repair. Each device may require different procedures during inspection, and have different maintenance/repair history. It becomes extremely time-consuming and confusing for an inspector inspecting the devices in an infrastructure to manually identify, locate, and retrieve information (such as a checklist) associated with each device. The inspector may have to browse through many devices before identifying the ones he/she is searching for. Alternatively, the inspector may have to locate identification information associated with the inspected devices, and manually enter into a mobile device.

Further, the inspector may rely on the mobile device (for its portability and low cost) for reviewing the information associated with the device and providing input. It may be very difficult to view the retrieved information and provide input using a mobile device such as a cellular phone. Therefore, improvements in retrieving information for inspected devices may be desirable.

Figure 1:
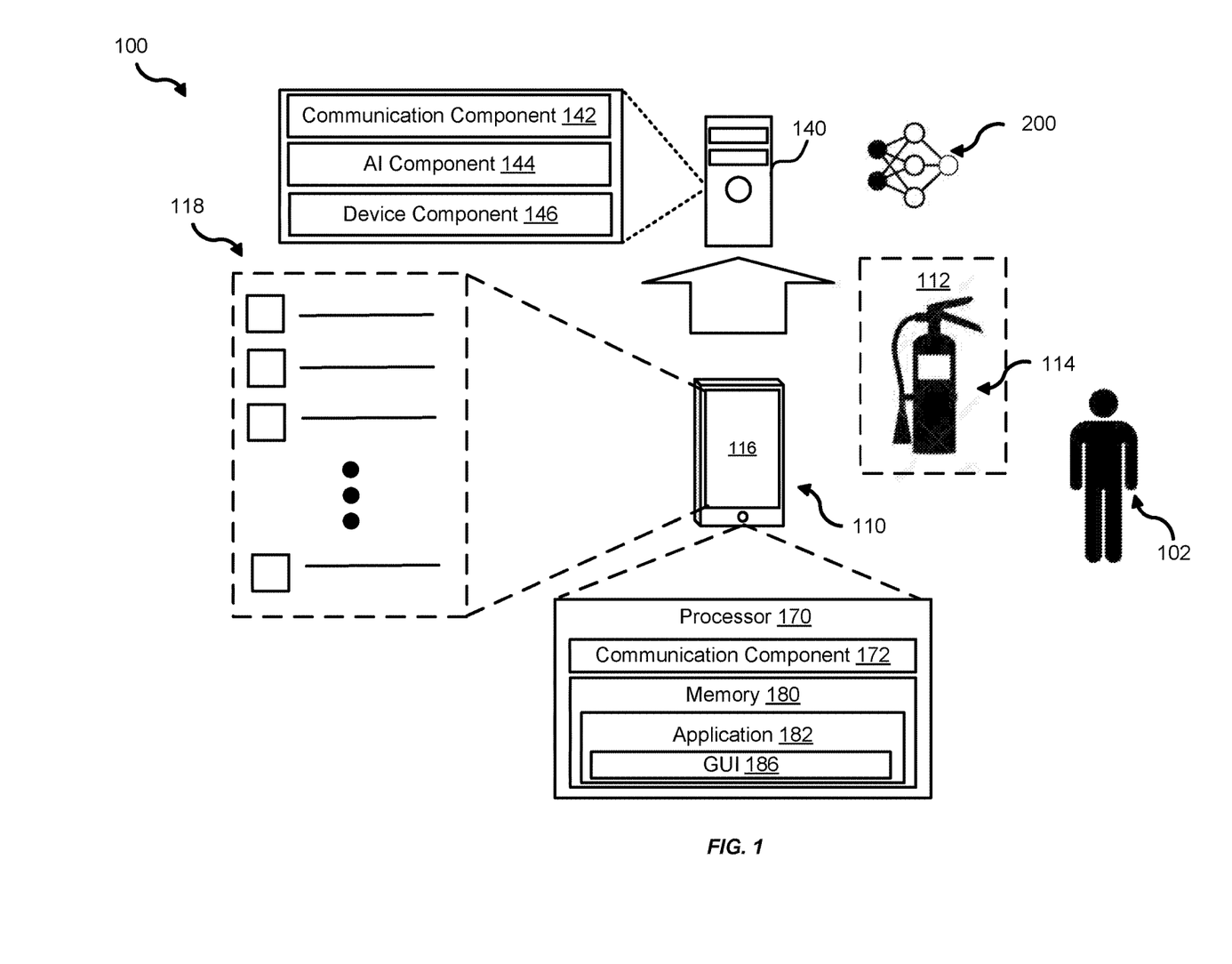
FIG. 1 illustrates an example of an environment for implementing the automated inspection process in accordance with aspects of the present disclosure.

Referring to FIG. 1, an example of an environment 100 for implementing the automated inspection process may include an inspector that uses a mobile device to capture one or more images of an inspected device. The inspector utilize the mobile device to transmit the one or more images to a remote server. The remote server may use a neural network to identify visual features (e.g., edges, outlines, colors, logos, contours, bar codes, hardware addresses, makes, models, etc.) of the inspected device from the one or more images. Based on the identified visual features, the neural network may identify the inspected device. The remote server, in response to the neural network identifying the inspected device, may generate a checklist associated with the inspected device, such as previous notes, questions, checklists, etc. The remote server may transmit the checklist back to the mobile device for the inspector.

In some implementations, a user 102, such as an inspector of equipment and devices, may use a mobile device 110 to capture one or more images 112 of an inspected device 114, such as an image 112 captured by a sensor, such as a camera, on the mobile device 110. A server 140 may receive the one or more images 112 from the mobile device 110. The server 140 may include or be in communication with a neural network 200. For example, in an aspect, mobile device 110 may include a processor 170 that executes instructions stored in memory 180. The mobile device 110 may include a camera (not shown) to capture the one or more images 112. The mobile device 110 may include a display that displays information. The mobile device 110 may include a microphone that receives audio input. For example, in an aspect, server 140 may include a processor for executing instructions stored in a memory. Examples of the mobile device 110 and/or the server 140 are described in FIG. 5 below.

Figure 2:
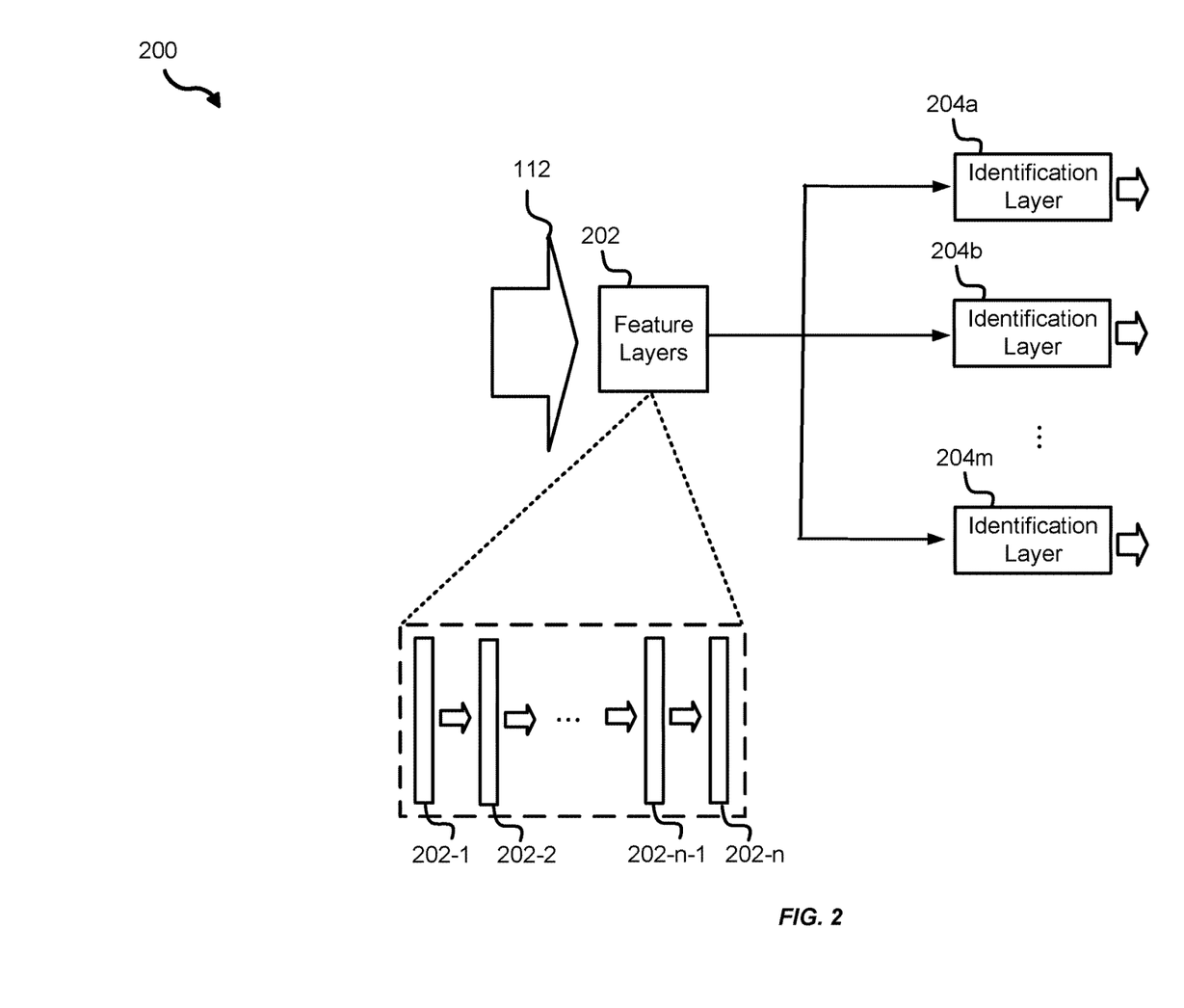
FIG. 2 illustrates an example of a neural network in accordance with aspects of the present disclosure.

In certain instances, the server 140 may include a communication component 142 that receives and/or sends data (such as the one or more images 112) from and to other devices, such as a mobile device 110. For example, in an aspect, communications component 142 may be a processor executing instructions to perform the functions of transmitting and/or receiving data. The server 140 may include an artificial intelligence (AI) component 144 that performs AI operations (such as feature extractions and identifications) to identify the inspected device 114 based on the one or more images 112. For example, in an aspect, AI component 144 may include a processor executing instructions to perform the functions of sending and/or receiving data to and/or from the neural network 200. The server 140 may include a device component 146 that retrieves and/or generates a checklist 118 associated with the inspected device 114 after the neural network 200 identifies the inspected device 114. For example, in an aspect, device component 146 may include a processor executing instructions to perform the functions of locating, identifying, and/or generating the checklist 118.

In certain instances, the mobile device 110 may include a communication component 172 that receives and/or sends data (such as the one or more images 112) from and to other devices, such as the server 140. For example, in an aspect, communications component 172 may include a processor executing instructions to perform the functions of transmitting and/or receiving data. The mobile device 110 may include an application 182 stored in a memory 180. When the instructions of the application 182 are executed by the processor 170, a graphical user interface (GUI) 186 may display the checklist 118 via the display 116. The GUI 186 may include controls, text input boxes, etc.

During normal operations, in some implementations, the user 102 may be tasked to inspect the inspected device 114. Examples of the inspected device 114 may include fire extinguishers, fire alarms, smoke detectors, alarm panels, safety locks, emergency exits, emergency signs, security sensors, heating, ventilation, and air conditioning (HVAC) equipment, etc. The user 102 may use the mobile device 110 (e.g., one or more cameras) to capture the one or more images 112 of the inspected device 114. The user 102 may use the mobile device 110 to transmit the one or more images 112 to the server 140 for identification of the inspected device 114. For example, the user 102 may capture the one or more images 112 via the mobile device 110, and execute instructions on the mobile device 110 to transmit the one or more images 112 to the server 140.

In optional implementations, the user 102 may transmit other input information, such as audio information dictated by the user 102 (e.g., the user 102 dictating a description of the inspected device 114), serial number associated with the inspected device 114, location information (e.g., global positioning system (GPS) coordinate, street address, etc.) associated with the infrastructure (not shown) that the inspected device 114 is located, identification information associated with the user 102 (e.g., user ID associated with the user 102, employee number preprogrammed into the mobile device 110, name of the user 102), or other information used to identify the inspected device 114.

In one example, the user 102 may dictate the description of the inspected device 114 by speaking into a microphone of the mobile device 110. The dictated audio may be stored in the memory of the mobile device 110. The dictated audio may be associated with the inspected device 114 (e.g., having the same unique number assigned to the dictate audio and the inspected device 114).

In some instances, the communication component 142 of the server 140 may receive the one or more images 112 form the mobile device 110. The one or more images 112 may show visual features (e.g., outlines, colors, logos, contours, bar codes, hardware addresses, makes, models, etc.) of the inspected device 114. The AI component 144 of server 140 may send the one or more images 112 to the neural network 200 (details discussed below) to identify the inspected device 114. The AI component 144 may manage input and/or output into/from the neural network 200. For example, the AI component 144 may convert the one or more images 112 into appropriate format for the neural network 200. The neural network 200 may identify the inspected device 114 by identifying one or more of the type, make, model, location, and/or identification number of the inspected device 114. For example, based on analyzing data from the image relating to serial number information, the neural network 200 may identify the inspected device 114 as a Johnson Control Sentry dry chemical fire extinguisher in the lobby of the infrastructure having an identification number of 1234ABCD5678EFGH.

In certain implementations, after the neural network 200 identifies the inspected device 114, the device component 146 of the server 140 may retrieve the checklist 118 associated with the identified inspected device 114. In some example, the device component 146 may retrieve repair logs, inspection checklists, notes, operating manuals, maintenance manuals, maintenance history, etc., stored in the memory of the server 140. The retrieved checklist 118 may be associated with the make and/or model of the inspected device 114 or the particular inspected device 114. The tasks and/or questions in the checklist 118 may be used by the user 102 to inspect the inspected device 114.

In some implementations, the communication component 142 of the server 140 may transmit the retrieved checklist 118 associated with the inspected device 114 to the mobile device 110. The mobile device 110 may present, visually via a display device (not shown) or aurally via a speaker (not shown), to the user 102. The user 102 may use the retrieved checklist 118 to perform inspection, maintenance, repair, upgrade, replacement, or other tasks to the inspected device 114.

In one example, the mobile device 110 may capture the one or more images 112 of a fire extinguisher as the inspected device 114. The mobile device 110 may transmit the one or more images 112 to the server 140 and/or the neural network 200 for identification. The server 140 may generate the checklist 118 including tasks and/or questions such as "Is the fire extinguisher full" and "Check if the pin is still attached."

In another example, the mobile device 110 may capture the one or more images 112 of an alarm panel as the inspected device 114. The mobile device 110 may transmit the one or more images 112 to the server 140 and/or the neural network 200 for identification. The server 140 may generate the checklist 118 including tasks and/or questions such as "Is the communication connection active," "Check if the battery requires replacement," "Check if the siren works."

In yet another example, the mobile device 110 may capture the one or more images 112 of a fire panel as the inspected device 114. The mobile device 110 may transmit the one or more images 112 to the server 140 and/or the neural network 200 for identification. The server 140 may generate the checklist 118 including previous repair information (e.g., when did the repair occur, what was repaired . . . ).

In optional implementations, the user 102 may dictate audio inputs (e.g., via a microphone) into the mobile device 110 in response to the retrieved checklist 118. In one example, the retrieved checklist 118 may include an inspection checklist having inspection items #1 to #10. The user 102, who may be an inspector of the inspected device 114, may dictate into the mobile device 110 which item has passed the inspection and which item has failed. In another example, the retrieved checklist 118 may include a repair log of the inspected device. The user 102, who may be a repair person, may dictate into the mobile device 110 whether the inspected device 114 may require repair and/or the type of repair.

In some implementations, the user 102 may provide input via a stylus, a touchscreen, a keyboard, or other input devices into the mobile device 110. The input may be stored in the memory 180.

In one aspect of the present disclosure, the retrieved checklist 118 may include a list of tasks or questions. The mobile device 110 may provide, via the display device or the speaker, the tasks or questions sequentially. The user 102, upon receiving a task or a question, may provide audio input, which may be stored in the memory 180.

Turning to FIG. 2, an example of the neural network 200 for identification may include feature layers 202 that receive the one or more images 112 as input. The feature layers 202 may be a deep learning algorithm that includes feature layers 202-1, 202-2 . . . , 202-$n$–1, 202-$n$. Each of the feature layers 202-1, 202-2 . . . , 202-$n$–1, 202-$n$ may perform a different function and/or algorithm (e.g., edge detection, logo detection, pattern detection, alphanumeric/symbol identification, transformation, feature extraction, etc.). In a non-limiting example, the feature layer 202-1 may identify edges of the one or more images 112, the feature layer 202-$b$ may identify corners of the one or more images 112, the feature layer 202-$n$–1 may perform a non-linear transformation, and the feature layer 202-$n$ may perform a convolution. In another example, the feature layer 202-1 may apply an image filter to the one or more images 112, the feature layer 202-2 may perform a Fourier Transform to the one or more images 112, the feature layer 202-$n$–1 may perform an integration, and the feature layer 202-$n$ may identify a vertical edge and/or a horizontal edge. Other implementations of the feature layers 202 may also be used to extract features of the one or more images 112.

In certain implementations, the output of the feature layers 202 may be provided as input to identification layers 204$a$, 204$b$ . . . 204$m$. The identification layer 204$a$ may be configured to identify a fire extinguisher. The identification layer 204$b$ may be configured to identify a security alarm. The identification layer 204$m$ may be configured to identify a fire panel. The identification layers 204 may identify the inspected device 114 based on the output of the features layer 202. The neural net using transfer learning from an existing trained network such as ImageNet is retrained to recognize in-building assets such as fire extinguishers, security cameras, smoke detectors etc.

During normal operations, the feature layers 202 of the neural network 200 may receive the one or more images 112. The feature layers 202-1, 202-2 . . . , 202-n–1, 202-n may identify features (e.g., edges, outlines, colors, logos, contours, bar codes, hardware addresses, makes, models, etc.) in the one or more images 112. The feature layers 202 may send the identified features to the identification layers 204. The identification layers 204 may receive the identified features. In some implementations, the identification layers 204a, 204b . . . 204m may receive the same identified features. In other implementations, the identification layers 204a, 204b . . . 204m may receive different identified features. In some implementations, the identified features may be numerical representations (e.g., numbers, vectors, matrix, etc.) that enable the identification layers 204a, 204b . . . 204m to identify the inspected device 114.

In an aspect, the identification layers 204 may identify the make and/or model of the inspected device 114. For example, the identification layers 204 may identify the inspected device 114 to be a Johnson Control Sentry dry chemical fire extinguisher. In a different aspect, the identification layers 204 may identify the inspected device as a Johnson Control Sentry dry chemical fire extinguisher in the lobby of the infrastructure having an identification number of 1234ABCD5678EFGH. Different levels of granularity in the identification process may be possible.

Figure 3:
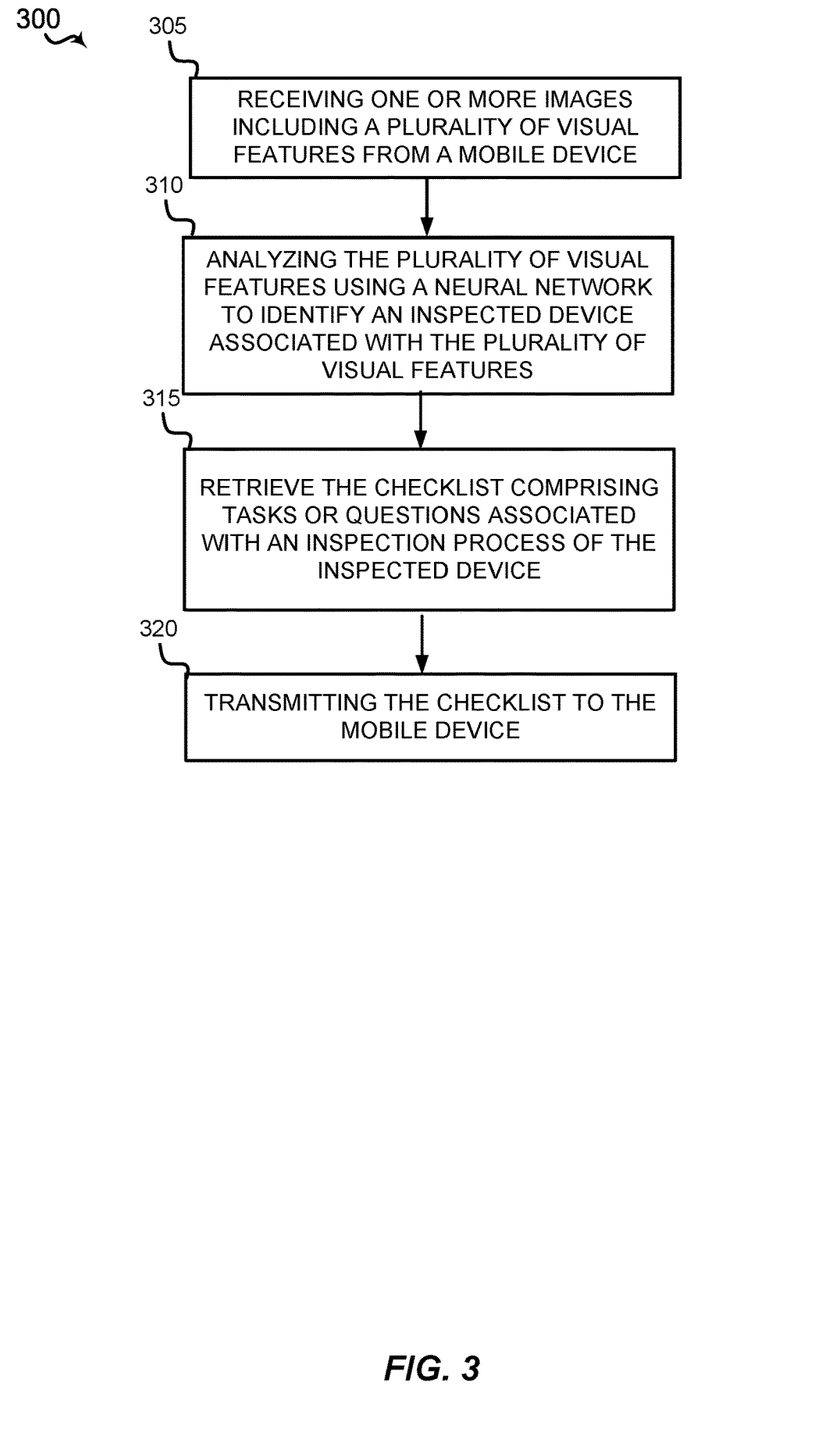
FIG. 3 illustrates an example of a method for implementing the automated inspection process from the perspective of the server in accordance with aspects of the present disclosure.

Turning now to FIG. 3, a method 300 of implementing the automated inspection process from the perspective of the server 140 may be performed by the server 140, the communication component 142, the AI component 144, and/or the device component 146.

At block 305, the method 300 may receive one or more images including a plurality of visual features from a mobile device. For example, the communication component 142 may receive the one or more images 112 including features (e.g., edges, outlines, colors, logos, contours, bar codes, hardware addresses, makes, models, etc.) of the inspected device 114 from the mobile device 110.

At block 310, the method 300 may analyze the plurality of visual features using a neural network to identify an inspected device associated with the plurality of visual features. For example, the AI component 144 may analyze the features of the one or more images 112 to identify the inspected device 114.

At block 315, the method 300 may retrieve the checklist comprising tasks or questions associated with an inspection process of the inspected device. For example, the device component 146 may retrieve the checklist 118, such as repair logs, notes, operating manuals, maintenance manuals, maintenance history, associated with the inspected device 114.

At block 320, the method 300 may transmit the checklist to the mobile device. For example, the communication component 142 may transmit the checklist to the mobile device 110.

Figure 4:
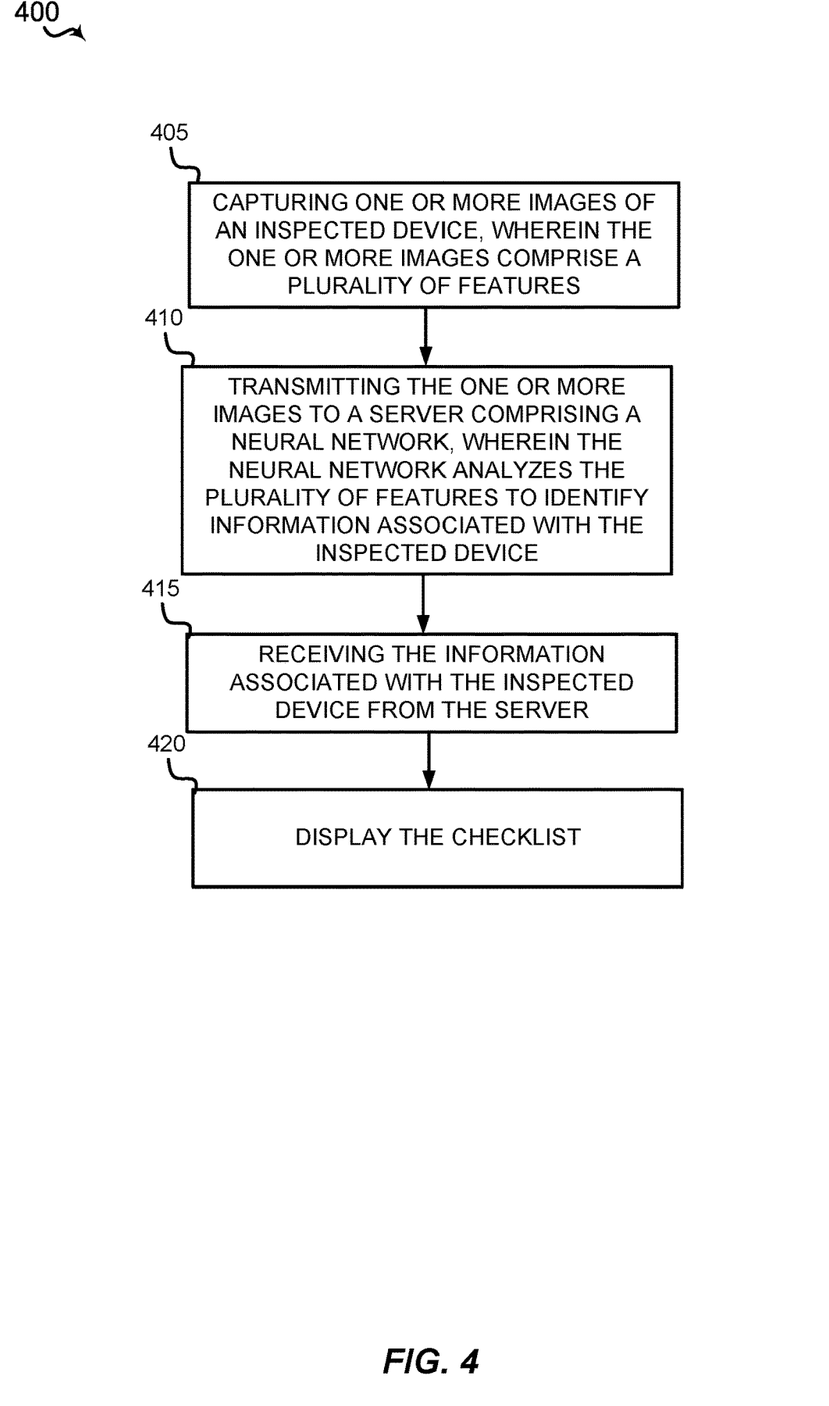
FIG. 4 illustrates an example of a method for implementing the automated inspection process from the perspective of the mobile device in accordance with aspects of the present disclosure.

Turning now to FIG. 4, a method 400 of implementing the automated inspection process from the perspective of the mobile device 110 may be performed by the mobile device 110 and/or the communication component 172.

At block 405, the method 400 may capture one or more images comprising a plurality of visual features of an inspected device. For example, the camera of the mobile device 110 may capture one or more images of an inspected device, wherein the one or more images comprise a plurality of features.

At block 410, the method 400 may transmit the one or more images to a server comprising a neural network, wherein the neural network analyzes the plurality of visual features to identify the inspected device and the server identifies the checklist comprising tasks or questions associated with an inspection process of the inspected device. For example, the communication component 172 may transmit the one or more images 112 to the server 140 and/or the neural network 200.

At block 415, the method 400 may receive the checklist associated from the server. For example, the communication component 172 may receive the checklist, such as repair logs, inspection checklists, notes, operating manuals, maintenance manuals, maintenance history, associated with the inspected device 114.

At block 420, the method 400 may display the checklist. For example, the GUI 186 and/or the display 116 may display the checklist.

Figure 5:
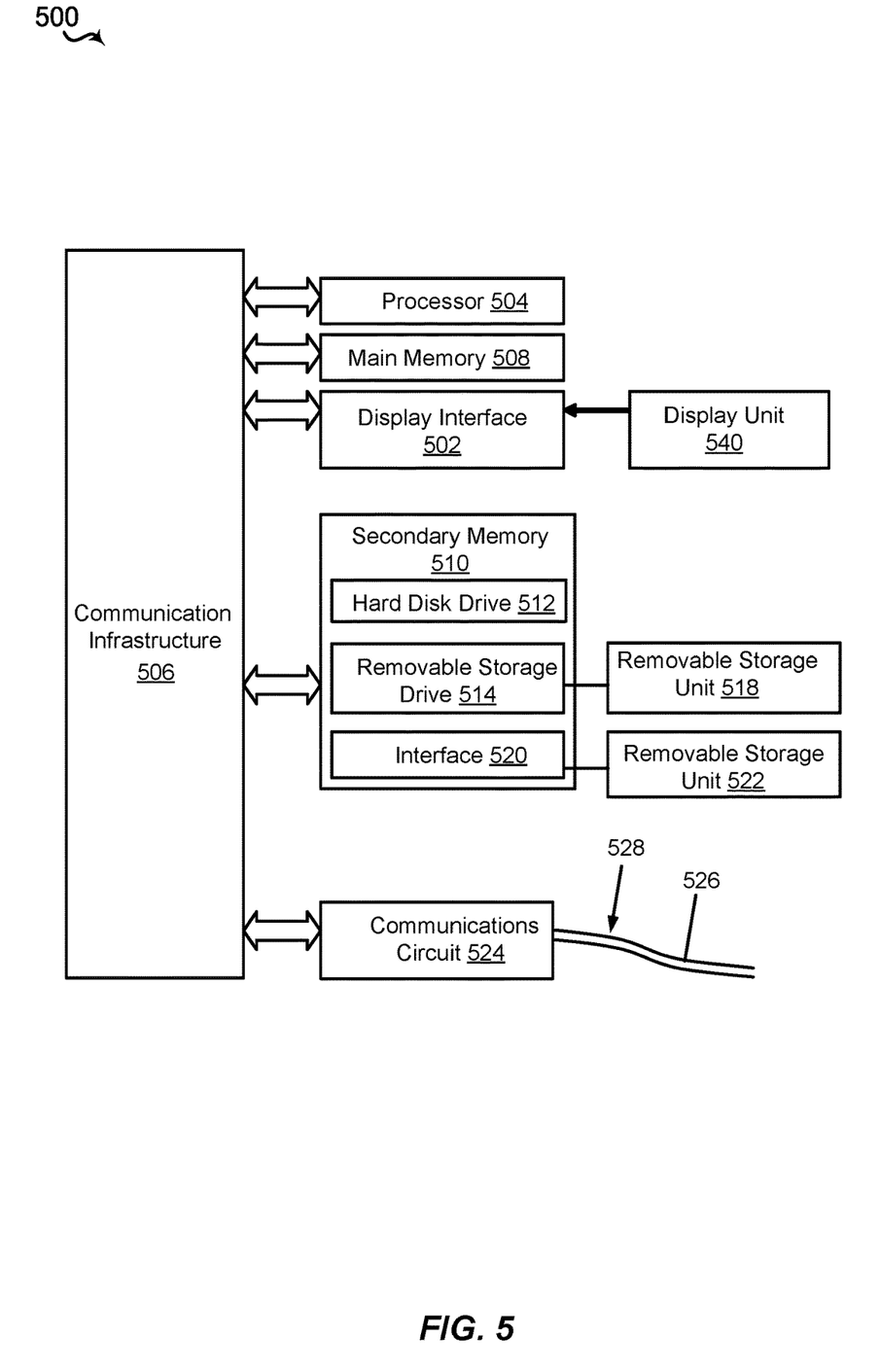
FIG. 5 illustrates an example of a computer system in accordance with aspects of the present disclosure.

Aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. An example of such the computer system 500 is shown in FIG. 5. In some examples, the server 140 and/or neural network 200 may be implemented as the computer system 500 shown in FIG. 5. The server 140 may include some or all of the components of the computer system 500.

The computer system 500 includes one or more processors, such as processor 504. The processor 504 is connected with a communication infrastructure 506 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The computer system 500 may include a display interface 502 that forwards graphics, text, and other data from the communication infrastructure 506 (or from a frame buffer not shown) for display on a display device 540. Computer system 500 also includes a main memory 508, preferably random access memory (RAM), and may also include a secondary memory 510. The secondary memory 510 may include, for example, a hard disk drive 512, and/or a removable storage drive 514, representing a floppy disk drive, a magnetic tape drive, an optical disk drive, a universal serial bus (USB) flash drive, etc. The removable storage drive 514 reads from and/or writes to a removable storage unit 518 in a well-known manner. Removable storage unit 518 represents a floppy disk, magnetic tape, optical disk, USB flash drive etc., which is read by and written to removable storage drive 514. As will be appreciated, the removable storage unit 518 includes a computer usable storage medium having stored therein computer software and/or data. In some examples, one or more of the main memory 508, the secondary memory 510, the removable storage unit 518, and/or the removable storage unit 522 may be a non-transitory memory.

Alternative aspects of the present disclosures may include secondary memory 510 and may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications circuit 524. The communications circuit 524 may allow software and data to be transferred between computer system 500 and external devices. Examples of the communications circuit 524 may include a modem, a network interface (such as an Ethernet card), a communications port, a Personal Computer Memory Card International Association (PCMCIA) slot and card, etc. Software and data transferred via the communications circuit 524 are in the form of signals 528, which may be electronic, electromagnetic, optical or other signals capable of being received by the communications circuit 524. These signals 528 are provided to the communications circuit 524 via a communications path (e.g., channel) 526. This path 526 carries signals 528 and may be implemented using wire or cable, fiber optics, a telephone line, a cellular link, an RF link and/or other communications channels. In this document, the terms "computer program medium" and "computer usable medium" are used to refer generally to media such as the removable storage unit 518, a hard disk installed in hard disk drive 512, and signals 528. These computer program products provide software to the computer system 500. Aspects of the present disclosures are directed to such computer program products.

Computer programs (also referred to as computer control logic) are stored in main memory 508 and/or secondary memory 510. Computer programs may also be received via communications circuit 524. Such computer programs, when executed, enable the computer system 500 to perform the features in accordance with aspects of the present disclosures, as discussed herein. In particular, the computer programs, when executed, enable the processor 504 to perform the features in accordance with aspects of the present disclosures. Accordingly, such computer programs represent controllers of the computer system 500.

In an aspect of the present disclosures where the method is implemented using software, the software may be stored in a computer program product and loaded into computer system 500 using removable storage drive 514, hard disk drive 512, or communications interface 520. The control logic (software), when executed by the processor 504, causes the processor 504 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

Figure 6:
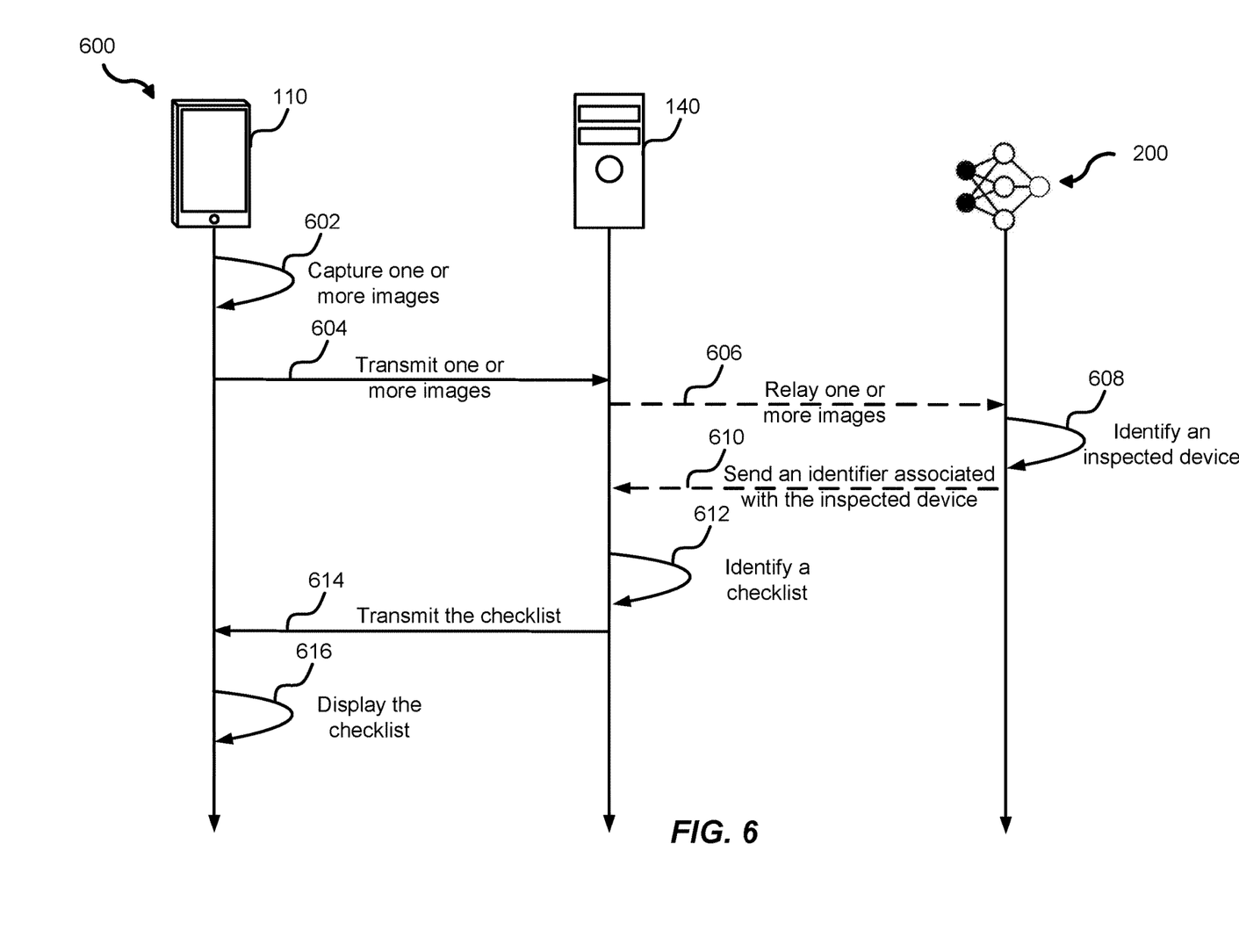
FIG. 6 illustrates an example of a process flow for implementing the automated inspection processor in accordance with aspects of the present disclosure.

Turning to FIG. 6, in an aspect of the present disclosure, an environment 600 for implementing aspects of the present disclosure may include the mobile device 110, the server 140, and/or the neural network 200.

At 602, the mobile device 110 may capture the one or more images 112.

At 604, the mobile device 110 may transmit the one or more images 112 to the server 140.

At 606, the server 140 may optionally relay the one or more images 112 to the neural network 200.

At 608, the neural network 200 may identify the inspected device 114 using the one or more features of the one or more images 112.

At 610, the neural network 200 may optionally send an identifier associated with the inspected device 114 to the server 140.

At 612, the server 140 may utilize the identifier associated with the inspected device 114 to identify or generate the checklist 118.

At 614, the server 140 may transmit the checklist 118 to the mobile device 110.

At 616, the mobile device 110 may display the tasks/questions associated with the checklist 118.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A mobile device for inspection, comprising;
a camera;
a memory that store instructions; and
a processor configured to execute the instructions to:
cause the camera to capture one or more images comprising a plurality of visual features of an inspected device, wherein the plurality of visual features are configured to identify the inspected device, and wherein the inspected device is associated with an inspection process;
identify location information associated with the inspected device;
transmit the one or more images and the location information to a server comprising a neural network configured to identify the inspected device from the plurality of features and the location information and to identify a checklist of tasks or questions associated with the inspection process for the inspected device, wherein the neural network includes:
a plurality of feature layers configured to extract the plurality features of the one or more images, and
a plurality of identification layers configured to identify a plurality of inspected devices;
receive the checklist associated with the inspected device as identified by the neural network from the server; and
display a formatted user interface of one or more the tasks or the questions from the checklist.

2. The mobile device of claim 1, further comprises a speaker configured to aurally provide at least one of the tasks or questions associated with the inspection process of the inspected device.

3. The mobile device of claim 1, further comprises a microphone configured to receive audio input in response to providing the checklist.

4. The mobile device of claim 1, further comprising:
a speaker configured to provide aural output; and
a microphone configured to receive audio input;
wherein the processor is further configured to:
cause the speaker to provide, aurally, a first question or task of the checklist;
cause the microphone to receive a first audio input in response to the first question or task;
cause the speaker to provide, aurally, a second question or task of the checklist; and cause the microphone to receive a second audio input in response to the second question or task.

5. The mobile device of claim 1, wherein the processor is further configured to execute the instructions to display a list of tasks and questions comprising controls and text-input boxes.

6. The mobile device of claim 1, wherein the neural network is further configured to identify the inspected device based on a serial number associated with the inspected device or identification information associated with a user of the mobile device.

7. A method of automating a display of a checklist at a computer device, comprising:
capturing, by a camera of a computer device, one or more images comprising a plurality of visual features of an inspected device, wherein the plurality of visual features are configured to identify the inspected device, and wherein the inspected device is associated with an inspection process;
identifying location information associated with the inspected device;
transmitting, by a transmitter of the computer device, the one or more images and the location information to a server comprising a neural network configured to identify the inspected device from the plurality of features and the location information and to identify a checklist of tasks or questions associated with the inspection process for the inspected device, wherein the neural network includes:
a plurality of feature layers configured to extract the plurality features of the one or more images, and
a plurality of identification layers configured to identify a plurality of inspected devices;
receiving, by a receiver of the computer device, the checklist associated with the inspected device as identified by the neural network from the server; and
displaying, by a display of the computer device, a formatted user interface of one or more the tasks or the questions from the checklist.

8. The method of claim 7, further comprising generating, by a speaker, an aural output representative of at least one of the tasks or the questions associated with the inspection process of the inspected device.

9. The method of claim 7, further comprising receiving, at a microphone of the computer device, an audio input in response to displaying the formatted user interface of the one or more of the tasks or the questions from the checklist.

10. The method of claim 7, wherein displaying the formatted user interface further comprises displaying a list of tasks and questions comprising controls and text-input boxes.

11. The method of claim 7, further comprising:
generating, by a speaker of the computer device, a first aural output representative of a first question or task of the checklist;
receiving, at a microphone of the computer device, a first audio input in response to the first question or task;
generating, by a speaker of the computer device, a second aural output representative of second question or task of the checklist; and
receiving, at a microphone of the computer device, a second audio input in response to the second question or task.

12. The non-transitory computer readable medium of claim 11, further comprises instructions that, when executed by the processor of the mobile device, cause the processor to:
cause a speaker to provide a first aural output representative of a first question or task of the checklist;
cause a microphone to receive, a first audio input in response to the first question or task;
cause the speaker to provide a second aural output representative of second question or task of the checklist; and
cause the microphone to receive, a second audio input in response to the second question or task.

13. The non-transitory computer readable medium of claim 11, wherein the instructions for displaying the formatted user interface further comprises instructions that, when executed by the processor of the mobile device, cause the processor to display a list of tasks and questions comprising controls and text-input boxes.

14. A system, comprising:
a neural network configured to identify an inspected device from a plurality of features and location information associated with the inspected device, wherein the neural network includes:
a plurality of feature layers configured to extract the plurality features of one or more images, and
a plurality of identification layers configured to identify a plurality of inspected devices;
a server configured to identify a checklist of tasks or questions associated with an inspection process for the inspected device; and
a mobile device configured to:
capture, by a camera of the mobile device, the one or more images comprising the plurality of visual features of the inspected device, wherein the plurality of visual features are configured to identify the inspected device, and wherein the inspected device is associated with the inspection process;
identify the location information associated with the inspected device;
transmit, by a transmitter of the mobile device, the one or more images and the location information to the server;
receive, by a receiver of the mobile device, the checklist associated with the inspected device as identified by the neural network; and
displaying, by a display of the mobile device, a formatted user interface of one or more the tasks or the questions from the checklist.

15. A non-transitory computer readable medium comprising instructions stored therein that, when executed by a processor of a mobile device, cause the processor to:
cause a camera to capture one or more images comprising a plurality of visual features of an inspected device, wherein the plurality of visual features are configured to identify the inspected device, and wherein the inspected device is associated with an inspection process;
identify location information associated with the inspected device;
transmit the one or more images and the location information to a server comprising a neural network configured to identify the inspected device from the plurality of features and the location information and to identify a checklist of tasks or questions associated with the inspection process for the inspected device, wherein the neural network includes:
a plurality of feature layers configured to extract the plurality features of the one or more images, and
a plurality of identification layers configured to identify a plurality of inspected devices;

receive the checklist associated with the inspected device as identified by the neural network from the server; and
display a formatted user interface of one or more the tasks or the questions from the checklist.

16. The non-transitory computer readable medium of claim 15, further comprises instructions that, when executed by the processor of the mobile device, cause the processor to cause a speaker to provide an aural output representative of at least one of the tasks or the questions associated with the inspection process of the inspected device.

17. The non-transitory computer readable medium of claim 15, further comprises instructions that, when executed by the processor of the mobile device, cause the processor to cause a microphone to receive an audio input in response to displaying the formatted user interface of the one or more of the tasks or the questions from the checklist.

* * * * *